Figure 1:
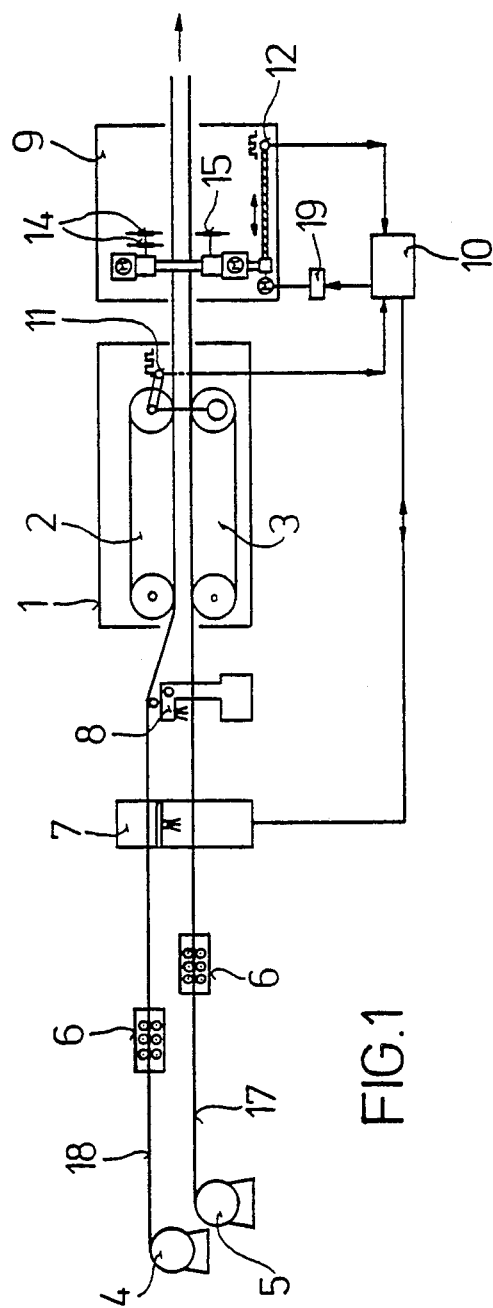

United States Patent [19]

Adolf

[11] Patent Number: 4,755,250
[45] Date of Patent: Jul. 5, 1988

[54] METHOD FOR THE PRODUCTION OF RIGID FOAM SHEETS

[75] Inventor: Herbert Adolf, Antdorf, Fed. Rep. of Germany

[73] Assignee: Elastogran GmbH, Lemförde, Fed. Rep. of Germany

[21] Appl. No.: 807,474

[22] Filed: Dec. 10, 1985

[30] Foreign Application Priority Data

Dec. 12, 1984 [DE] Fed. Rep. of Germany ....... 3445290

[51] Int. Cl.⁴ ............................................. B32B 31/18
[52] U.S. Cl. ...................................... 156/268; 156/78; 156/79; 156/289; 156/353; 156/356; 156/269; 83/42; 83/52; 83/369; 83/862; 264/45.8; 264/46.2; 264/46.5
[58] Field of Search ..................... 156/77, 78, 79, 268, 156/269, 289, 306.3, 354, 356, 366; 83/34, 35, 42, 52, 369, 861, 862, 863, 865; 264/45.8, 46.2, 46.5

[56] References Cited

U.S. PATENT DOCUMENTS

| | | | |
|---|---|---|---|
| 3,488,248 | 1/1970 | Long | 156/79 |
| 3,531,350 | 9/1970 | Rausing et al. | 156/268 |
| 3,745,864 | 7/1973 | Watson | 83/369 |
| 3,793,122 | 2/1974 | Sullhofer | 156/289 |
| 4,407,179 | 10/1983 | Iwase et al. | 83/865 |
| 4,594,923 | 1/1986 | Fujita | 83/369 |

FOREIGN PATENT DOCUMENTS

1247612 8/1967 Fed. Rep. of Germany .

*Primary Examiner*—Caleb Weston
*Attorney, Agent, or Firm*—Keil & Weinkauf

[57] ABSTRACT

The process and the appropriate apparatus for producing rigid foam elements, in particular of polyurethane, operate with a double-belt unit, in which the rigid foam elements produced are provided with upper and lower cover sheets. A parting agent is applied on the lower cover sheet in a particular region in order to permit subsequent removal of the upper cover sheet and the ridge foam in this region, so that the lower cover sheet projects, and foams an overlapping section during subsequent use as a roofing element or the like. The invention permits a very precise cut to be made by means of the sawing apparatus at the end of the double-belt unit, taking into account the application of parting agent at the beginning and, if necessary, the movement of the sawing apparatus itself. This is carried out in principle by a method in which the position at which the parting agent is applied, and the path covered after this application, are input into a computer, which initiates the specified transverse cut after the section provided with parting agent has reached the transverse cut position. When the sawing apparatus itself is movable relative to the foam strand, an additional signal relating to this movement is input into the computer and is also taken into account in the initiation of a transverse cut. The electrical signals for the path covered and, where relevant, the movement of the sawing apparatus are generated by meters, meter for the path advantageously being connected to a tail shaft of the double-belt unit.

1 Claim, 2 Drawing Sheets

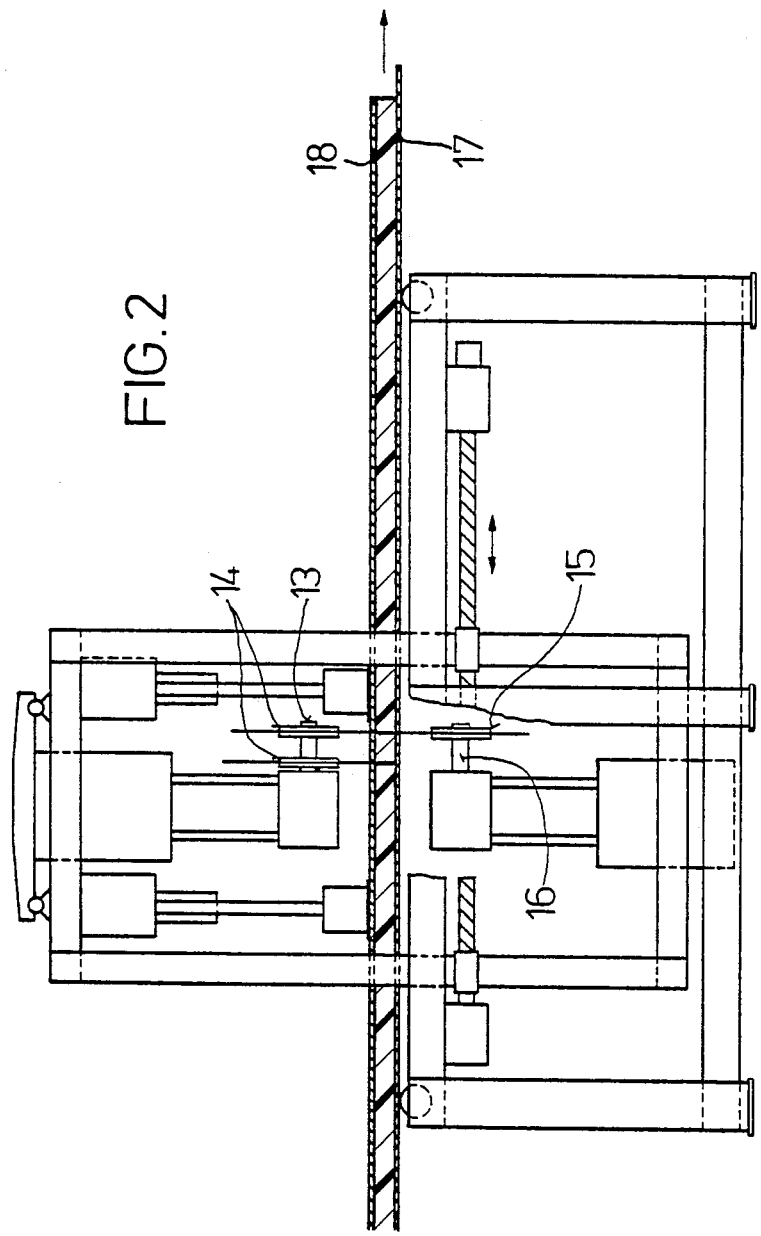

METHOD FOR THE PRODUCTION OF RIGID FOAM SHEETS

The present invention relates to a process for the production of rigid foam sheets, in particular of polyurethane, which are provided with cover sheets on their upper and lower sides, a parting agent being applied to the lower cover sheet prior to application of the rigid foam-forming components, and, after reaction and curing of the components is complete, two parallel transverse cuts being made over the section provided with parting agent, one of these cuts being a parting cut and the other separating only the upper cover sheet and the rigid foam layer.

Furthermore, the present invention relates to appatus for the production of rigid foam sheets, in particular of polyurethane, possessing a double-belt unit.

Processes of this type are carried out in doublebelt units. The rigid foam strands are laminated with rigid or more or less flexible cover sheets. Examples of flexible cover sheets are metal sheets which may or may not possess profiles. At the end of the double-belt unit is a sawing apparatus which cuts the continuously produced rigid foam strand into lengths. In practice, it is required to prepare from the continuously produced rigid foam strand individual elements which preferably possess, at an edge, a section which consists only of a cover sheet, ie. a strip is to be provided in which one of the cover sheets and the rigid foam have been removed. Elements of this type can, for example, then be laid for covering roofs in such a way that the remaining section of cover sheet lies over an adjacent element and thus gives a tight seal. In order to achieve this, not only is it necessary to use the sawing apparatus to make two parallel cuts, one of which is a complete parting cut while the other parts only one cover sheet, preferably the upper one, and the rigid foam underneath, it is also necessary to apply a parting agent in the region of the other cover sheet, in general the lower one, before application of the mixture of components, the said parting agent preventing the rigid foam being formed from adhering to the lower cover sheet in this region, ie. the rigid foam must be readily removable after the cuts have been made. Such double-belt units are very long, for example 80 m. The station where the parting agent is applied is located at the beginning of the unit, and the sawing apparatus at the end. When parting agent is applied to the lower cover sheet at the beginning, it is necessary for the cuts at the end to be made in very exact correspondence with the application of parting agent so that not only do the products have precise, reproducible lengths but the cuts are also made where the parting agent is located and where the rigid foam material is to be removed.

Attempts have been made to produce a mark mechanically where the parting agent has been applied, this mark then being used at the end of the double-belt unit to control the sawing apparatus. However, these experiments were not always satisfactory, owing to the poor precision.

It is an object of the present invention to provide a process and apparatus of the type stated at the outset, in which the transverse cuts at the end of the double-belt unit are made so that they correspond very exactly with the parting agent applied at the beginning, thus ensuring that the corresponding rigid foam elements possessing sections from which material has been separated off are produced in a precise and reproducible manner, precision being achieved even in the case of continuous production.

In accordance with the invention, the position at which the parting agent is applied is input into a computer. At the same time, the path covered by the foam strand or by the cover sheet or sheets is measured, and likewise input into the computer. When the distance between the station for the application of parting agent and the sawing apparatus is known, the sawing apparatus can be controlled very precisely.

Advantageously, in the process according to the present invention the transverse cut position is displaced relative to the direction of movement of the rigid foam strand and the displacement of the transverse cut position is likewise input into the computer and also taken into account in the initiating of the transverse cuts.

Usually, and particularly in the case of an appropriately wide foam strand, the sawing apparatus can be driven over a short distance together with the foam strand in order to avoid a relative movement of the foam strand in the transport direction while the cut is being made. For this purpose, the sawing apparatus is accelerated to a speed at which the foam strand is transported. The novel process makes it possible to alter the speed of the sawing apparatus itself relative to the transport speed so that the computer engages the sawing apparatus with the rigid foam strand, and initiates the parting cut, only when the exact position in relation to the section provided with parting agent has been reached, the movement of the saw itself also being taken into account. After the parting cut has been made, the sawing apparatus is disengaged and moved back to its starting position.

In the apparatus for carrying out the process, which possesses a double-belt unit, the path covered by a cover sheet is recorded by a meter which gives an appropriate electrical pulse and measures the movement of one of the belts of the double-belt unit.

In an advantageous embodiment of the apparatus, the meter is connected to one of the tail shafts of the double-belt unit.

In a further embodiment of the apparatus, a second meter which transmits appropriate electrical signals to the computer is provided on the sawing apparatus and measures the movement of the sawing apparatus relative to the rigid foam strand.

In yet another advantageous embodiment of the invention, the computer controls the relative movement of the sawing apparatus, taking into account the signals from the two meters, and initiates the transverse cuts only after the specified transverse cut position has been reached.

The invention is illustrated below, with reference to the drawings.

FIG. 1 shows a schematic side view of an apparatus for carrying out the process according to the invention and FIG. 2 shows a schematic side view, on a larger scale, of the end of the production apparatus in order to illustrate the rigid foam element being produced and the essential parts of the sawing apparatus.

The apparatus shown in the drawing consists of a double-belt unit 1 having upper and lower conveyor belts 2 and 3.

The cover sheets 17 and 18 are rolled off from stock drums 4 and 5 and may, if required, be profiled at 6. 7 denotes the station for applying the parting agent, downstream of which the coating gantry 8 for applying the rigid foam-forming components is provided.

Reaction and curing of the mixture of components are completed in the double-belt unit. The sawing apparatus is denoted by 9.

When the parting agent is applied on the lower cover sheet, an electrical signal is generated and input into the computer 10. A first meter 11 is connected to one of the trail shafts of the upper conveyer belt 2 and thus measures the path covered by the rigid foam strand. The meter 11 generates an electrical signal, which is likewise input into the computer 10.

A second meter 12 is provided on the saw apparatus 9; this meter measures the movement of the sawing apparatus and inputs an appropriate electrical signal into the computer 10.

FIG. 2 shows a longitudinal section through the foam strand. It can be seen that the lower cover sheet 17 projects beyond the upper cover sheet 18 and that a corresponding section of the rigid foam has been removed. To achieve this, two saw blades 14 located on a common shaft 13 are provided above and make a cut through the upper cover sheet down to the region of the lower cover sheet. A second saw blade 15 arranged underneath makes the final parting cut through the lower cover sheet. This second saw blade can be displaced on shaft 16 in order to make the final parting cut either in front or behind.

During operation, parting agent is initially applied on the lower cover sheet 17. This operation results in an appropriate signal being input into the computer 10. The components are then applied at the coating gantry 8. The upper cover sheet 18 is fed as far as the entrance to the double-belt unit 1. During this operation, the meter 11 continuously measures the path covered. When a predetermined path has been covered, the sawing apparatus 9 is accelerated via the unit 19 in order to avoid movement of the foam strand felative to the sawing apparatus in the direction of transport of the foam strand during the sawing operation. This relative movement is measured by meter 12 and likewise input into the computer by means of an appropriate electrical signal. When the distance between the station 7 for applying the parting agent and the sawing apparatus 9, and the movement of the sawing apparatus itself, have been taken into account to achieve the desired position for the transverse cut, the sawing operation is initiated, sawing being effected exactly in the region where the parting agent has been applied.

This operation is repeated continuously, the rigid foam elements being produced with the desired length; the corresponding number of pieces produced can likewise be stored in the computer.

I claim:

1. A process for the production of rigid foam sheets which are provided with cover sheets on their upper and lower sides, a parting agent being applied to the lower cover sheet prior to application of the rigid foam-forming components, and, after reaction and curing of the components is complete, two parallel transverse cuts being made over the section provided with parting agent, one of these cuts being a parting cut and the other separating only the upper cover sheet and the rigid foam layer, wherein a signal indicative of the position at which the parting agent is applied and also signals indicative of the length of the path covered by the lower cover sheet after this application are input into an electronic computer and wherein said computer initiates the transverse cut when the number of the last-mentioned signals corresponds to the distance, stored in the computer, between a saw and the section at which the parting agent is applied.

* * * * *